(12) United States Patent
Larsen et al.

(10) Patent No.: US 7,910,635 B2
(45) Date of Patent: Mar. 22, 2011

(54) SHEAR RESISTANT PRINTING INK VEHICLES

(75) Inventors: John H. Larsen, Woodridge, IL (US); Joshua M. Rosenheck, Concord, OH (US); Robert E. Quinn, Plainfield, IL (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 830 days.

(21) Appl. No.: 11/576,738

(22) PCT Filed: Oct. 14, 2006

(86) PCT No.: PCT/US2005/037910
§ 371 (c)(1),
(2), (4) Date: Jun. 7, 2007

(87) PCT Pub. No.: WO2006/045048
PCT Pub. Date: Apr. 27, 2006

(65) Prior Publication Data
US 2008/0107996 A1    May 8, 2008

Related U.S. Application Data

(60) Provisional application No. 60/619,624, filed on Oct. 18, 2004.

(51) Int. Cl.
| | |
|---|---|
| *C08C 19/22* | (2006.01) |
| *C08F 1/02* | (2006.01) |
| *C08F 1/04* | (2006.01) |
| *C08F 8/32* | (2006.01) |
| *C08F 283/00* | (2006.01) |
| *C08G 8/28* | (2006.01) |
| *C08G 8/34* | (2006.01) |
| *C08G 73/02* | (2006.01) |
| *C08L 61/00* | (2006.01) |
| *C09D 11/00* | (2006.01) |
| *C09F 1/00* | (2006.01) |

(52) U.S. Cl. ........ 523/160; 523/161; 525/290; 525/374; 525/375; 525/379; 525/380; 525/381; 525/382; 525/540; 527/600; 527/603; 530/210; 530/211; 530/214; 530/221

(58) Field of Classification Search .................. 523/160, 523/161; 525/290, 374, 375, 379, 380, 381, 525/382, 540, 509, 519; 527/600, 603; 530/210, 530/211, 214, 221, 212, 215, 216
See application file for complete search history.

(56) References Cited

U.S. PATENT DOCUMENTS

| | | | |
|---|---|---|---|
| 5,021,538 A | 6/1991 | Crews | |
| 5,208,319 A | 5/1993 | Schilling | |
| 5,763,565 A | 6/1998 | Williams et al. | |

FOREIGN PATENT DOCUMENTS

| | | |
|---|---|---|
| EP | 1028131 A2 | 8/2000 |
| GB | 1395587 A | 5/1975 |
| JP | 5171089 A | 7/1993 |

*Primary Examiner* — Patrick D Niland
(74) *Attorney, Agent, or Firm* — Samuel B. Laferty

(57) ABSTRACT

The specification describes a process for making gelled ink resins which exhibit improved properties such as lower viscosity under low shear and less viscosity decrease with increasing shear. In a preferred embodiment, a rosin-based or hydrocarbon-based resin is mixed with an organic solvent and reacted with a polyamine reactant, such as melamine-formaldehyde resin or hexamethylene diamine, under conditions sufficient to produce a substantially covalently cross-link gelled resin. The resulting gelled resin resists viscosity breakdown under high shear conditions and may be used directly for making ink compositions, obviating the need for further gelation and avoiding the use of conventional organo-metallic gelling agents.

13 Claims, No Drawings

SHEAR RESISTANT PRINTING INK VEHICLES

CROSS-REFERENCE TO RELATED APPLICATION

This application is filed pursuant to Provisional Application No. 60/619,624 filed on Oct. 18, 2004.

FIELD OF THE INVENTION

The present invention relates generally to high viscosity vehicle compositions for inks and to methods for making viscous ink vehicles. More particularly, the invention relates to an in situ process for making shear resistant vehicles which exhibit improved rheological performance characteristics for use in lithographic printing presses.

BACKGROUND OF THE INVENTION

Conventional rosin and hydrocarbon-based resins are prepared as relatively low viscosity resins in stirred reaction vessels. Such resins are usually highly branched and possess very broad molecular weight distributions. The product may even contain some fraction of crosslinked gelled structures, but this fraction is typically limited in quantity by virtue of the inability of a stirred tank vessel to handle the very high molten viscosity and non-Newtonian behavior that normally accompanies the presence of a gelled resin structure.

Lithographic ink vehicles or varnishes may be prepared from existing resins by dissolving/dispersing the resins in lithographic ink solvents and then subjecting the mixture to a so-called "gelling" reaction using an aluminum-based gelling agent. The role of the aluminum compound in the preparation of lithographic ink vehicles has typically been that of controlling the rheological properties of the ink vehicle. Known aluminum gelling compounds for use in preparing ink vehicles may be classified as: 1) aluminum soaps, 2) aluminum alkoxides, 3) chelated alkoxides and 4) oxyaluminum acylates. However, aluminum compounds require the generation or existence of an aluminum hydroxyl functionality to form the ultimate rheology or gel structure. The resulting gel structure is the result of relatively weak coordinate covalent or hydrogen bonding of the aluminum hydroxyl species with the binder resin system.

Since the coordinate covalent and hydrogen bonds formed with the aluminum gelling agents are relatively weak bonds, typically only about 5 to 10% as strong as covalent bonds, the gel structure afforded by such bonds is substantially degraded under the high shear conditions associated with modern lithographic printing. While some degree of thixotropic behavior is important for successful printing, there are limits to the degree of viscosity changes which can be tolerated before unwanted side effects emerge. Modern high speed printing presses rapidly degrade conventional ink vehicles to a significant degree. One consequence of the loss of viscosity in an ink vehicle is the development of misting, which is more pronounced in high speed presses leading to potential losses in print quality and degradation of the work environment. Misting may occur as a result of ink shear caused by high press speeds thereby forming minute droplets or mists of ink. Inks which maintain higher viscosities under high shear printing conditions are less likely to mist.

Yet another undesirable aspect of the use of gelling agents is that such agents are typically the most expensive ingredient in the varnish formulation on a weight percent basis. Hence, the use of organo-aluminum gelling agents presents a definite economic liability.

Additionally, the lithographic printing industry is shifting to the use of higher molecular weight/higher solution viscosity "self structuring" ink resins to improve the press performance of inks during high speed press operations. New generation lithographic printing presses are capable of achieving printing speeds in excess of 3000 feet/minute. In order for these ink vehicles to be effective in high speed printing presses, increased shear resistance of the vehicles with the printing equipment is important.

Japanese patent application JP5-171089 is directed to ink varnishes which exhibit high gloss and improved setting and drying properties as a result of crosslinking a portion of the polar groups of the binder resin before the resin is gelled with a metal gelling agent. The agents used to reduce the number of polar groups in the resin are certain amino compounds; preferably melamine resin or benzoguanamine resin containing at least one functional group selected from methylol, alkoxy and imino groups, and the reaction is conducted below the softening point of the binder resin and before all of the resin is dissolved. The gellation reaction is conducted separately from the crosslinking reaction once the polar groups have been sufficiently cross-linked.

U.S. Pat. No. 5,763,565 discloses a process for making gelled ink resins with improved properties. In one embodiment a rosin-based or hydrocarbon-based resin is mixed with an organic solvent and reacted with a crosslink agent under conditions sufficient to produce a substantially covalently cross-linked gelled resin.

A consequence of the loss of viscosity of an ink resin resulting from excessive shear is a loss of print sharpness. When a gelled ink resin is sheared to the extent that flow becomes significant, the printed dot is diffused thereby yielding excessive "dot gain" or poor print quality.

Because of the trend toward higher speed printing presses and the continuing need to improve the ink application process and print quality, there continues to be a need for improved resins for use as ink vehicles in the printing industry and improved processes for making the resins. An object of the invention is to provide shear resistant ink vehicle compositions which reduce misting and dot gain on high speed printing machines.

Still another object of the invention is to provide an in situ process for making shear resistant vehicle compositions of the character described with readily available, relatively inexpensive materials.

Another object of the invention is to provide a process for making viscous shear resistant vehicle compositions which enables improved control over the properties of the resins and which enables improved uniformity in the properties of large quantities of resin.

Yet another object of the invention is to provide a process for making resin compositions for high speed printing applications which maintain their viscosity even under the vigorous conditions associated with high speed printing.

An additional object of the invention is to provide a process for making shear resistant vehicles of the character described which is cost effective and uncomplicated and does not require the use of highly specialized or complicated equipment.

SUMMARY OF THE INVENTION

With regard to the forgoing and other objects, the present invention is directed to a viscous ink vehicle and an in situ process for making a shear resistant ink vehicle having relatively low viscosity at low shear rates and maintaining a relatively large percentage of its low shear viscosity under higher shear conditions. According to one aspect of the invention, a process is provided for making a shear resistant vehicle which comprises mixing a rosin- or hydrocarbon-based resin with an organic solvent and a polyamine and/or polyamino alcohol crosslinking agents such as melamine formaldehyde reaction products, urea formaldehyde reaction products or a compound having two or more secondary or tertiary amine groups to provide a reaction mass and then heating the mass under conditions sufficient to produce a substantially covalently cross-linked viscous vehicle which exhibits significantly increased viscosity at high shear rates as compared to the uncrosslinked resin solution, or solutions made with aluminum gelling agents, e.g., improved shear stability against viscosity loss and elasticity degradation from mechanical and thermal stresses imposed during its use in high speed printing machines.

Shear resistant vehicle compositions produced by the method of the invention have been found to provide stable vehicles for varnish and ink formulations even under high shear conditions. Accordingly, ink compositions containing a significant portion of the shear resistant vehicles made by the process of the invention have significantly improved misting and dot gain characteristics because they are able to maintain their viscosity and favorable elasticity properties even when subjected to severe mechanical and thermal stresses, whereas resin formulations that rely on the addition of aluminum gellants tend to lose their viscosity and elasticity properties under such conditions.

Another advantage of the process of the invention is that shear resistant vehicles may be prepared without significant degradation of the resin because the crosslinking reaction takes place at reasonable temperatures in situ in the solvent. Current practice for making high viscosity resins tends to induce degradation due to high temperatures required to "liquefy" the resins so that they can be dissolved in an ink solvent. The present invention overcomes this problem by first dissolving a relatively low molecular weight resin in an ink solvent at temperatures which do not induce significant degradation of the resin and then crosslinking the resin in situ in the solvent. As used herein, "shear resistant vehicle" refers to a viscous mixture of highly cross-linked resin with solvent dispersed therein so as to swell the cross-linked vehicle. Hence, the composition is not a true "solution" as this term is generally understood; however, the term "solution" is used herein for convenience.

According to another aspect of the invention, a process is provided for making shear resistant vehicles which comprises a) dissolving a resin selected from the group consisting of rosin- and hydrocarbon-based resins optionally in mixtures of one or both with other resins used in inks such as phenolic and alkyd resins in a solvent to provide a reaction mixture, and b) heating the reaction mixture at a temperature in the range of from about 120 to about 200° C. in the presence of a crosslink agent in an amount which is effective to induce formation of significant covalent cross-link bonds in the resin, thereby substantially increasing the viscosity of the resin solution. The process enables the production of viscous shear resistant vehicles which are compatible with organic ink solvents and which maintain their rheological properties (viscosity) even under high shear conditions.

DETAILED DESCRIPTION OF THE INVENTION

The present invention is directed to a shear resistant ink vehicle and to a process for making a shear resistant vehicle in situ which comprises mixing a rosin- or hydrocarbon-based resin optionally in mixtures of one or both with other ink resins such as phenolic or alkyd resins with a high boiling organic solvent and a polyamine crosslinking agent such as melamine formaldehyde reaction products, urea formaldehyde reaction products or polyamines and/or polyamino alcohols to provide a reaction mass. The reaction mass is heated under conditions sufficient to produce a substantially covalently cross-linked gelled resin solution which exhibits improved structural stability under mechanical and thermal stresses imposed during high speed printing.

As used herein in relation to the term "resin", the terms "rosin-based" and "hydrocarbon-based" refer to and include any of the functionalized rosin-based resins used in ink manufacturing as well as the neutral and functionalized cyclic and dicyclic unsaturated hydrocarbon resin compounds derived from hydrocarbon feeds containing from about 5 to about 15 carbon atoms, which also find wide usage in ink making.

The term "rosin" as used herein will be understood to include gum rosin, wood rosin, and tall oil rosin. Rosin is derived from pine trees (chiefly *Pinus palustris* and *Pinus elliottii*). Gum rosin is the residue obtained after the distillation of turpentine from the oleoresin tapped from living pine trees. Wood rosin is obtained by extracting pine stumps with naphtha or other suitable solvents and distilling off the volatile fraction. Tall oil rosin is a co-product of the fractionation of tall oil which in turn is a by-product of the wood pulping process. The principle constituents of rosin are rosin acids of the abietic and pimaric types. The acids usually have the general formula $C_{19}H_{29}COOH$ with a phenanthrene nucleus. A preferred rosin for use in the present invention is tall oil rosin.

Rosin in its natural state has limited use in inks. Its main use is as a raw material for producing chemically modified rosin derivatives for various end uses. Important modified rosin and rosin derivatives used in printing ink manufacturing are polymerized or dimerized rosin and esters thereof, metallic resinates, phenolic and/or maleic/fumaric modified rosins and their esters, and ester gums.

Important cyclic and dicyclic unsaturated hydrocarbon monomer feed streams which contain from about 5 to about 15 carbon atoms include cyclopentadiene and/or dicyclopentadiene (DCPD), and their codimers with C4 and C5 dienes such as butadiene and piperylene. Inexpensive commercially available DCPD concentrates typically contain from about 40 wt. % to about 90 wt. % DCPD and therefore are most preferred, although very high purity DCPD which is blended with olefinic modifier compounds may also be used.

Olefinic modifier compounds which may be used with the cyclic and dicyclic unsaturated olefins include ethylene, propylene, butadiene, styrene, alpha-methyl styrene, vinyl toluene, indene, 1,3-pentadiene, isobutylene, isoprene, 1-butene, 1-hexene, 1-octene, limonene, alpha-pinene, beta-pinene, various acrylates and mixtures of these compounds. The olefinic modifier compound(s) is typically used in an amount ranging from about 0% to about 35% by weight based on the total weight of cyclic and dicyclic unsaturated olefin and modifier compound.

In addition to the use of olefinic modifiers compounds, the hydrocarbon- and rosin-based resins may be modified with distilled tall oil fatty acid, dimerized fatty acid, vegetable oils, phenolic species, maleic anhydride or fumaric acid and combinations thereof. The foregoing modifier species may be added before, during or after the hydrocarbon- or rosin-based resin is gelled. In addition, esterification of the acid modified resins with polyols such as pentaerythritol and/or glycerine may be conducted to further modify the hydrocarbon- or rosin-based resin backbone.

Any of the foregoing modified rosins, rosin derivatives and esters thereof, or cyclic and dicyclic unsaturated olefins derived and/or modified/esterified resins may be used as the "precursor" resin for the methods of the invention. Higher molecular weight/higher solution viscosity resins are most preferred with solution viscosities in the range of from about Z2.0 to about Z10 at 25° C. measured on one gram of resin dissolved in two grams of alkali refined linseed oil according to the Gardener Holt bubble tube test method. Preferred precursor resins have a softening point in the range of from about 145 to about 180° C. and an acid number of no more than about 25. These higher molecular weight/higher solution viscosity resins are typically branched but are essentially not crosslinked. With higher molecular weight resins, the amount of crosslinking agent needed to produce the shear resistant vehicles by the process of the invention is typically reduced, though the chemical characteristics of the resin may affect the amount of crosslink agent required.

Solvents which may be used to prepare the vehicles of the invention include vegetable oils such as linseed or soybean oil, hydrocarbon solvents such as aliphatic and aromatic solvents and lithographic ink solvents. A preferred solvent is an organic solvent, most preferably a high boiling organic solvent which has a boiling point in the range of from about 220 to about 310° C. For rosin-based or hydrocarbon-based resins, high boiling aliphatic solvents such as MAGIESOL (47, 470, 4700, N40HT, 500 or 520) which are commercially available from Magie Brothers Oil Company, Division of Pennzoil of Franklin Park, Ill. and EXXPRINT (283D, 314A, 588D or 705A) which are hydrocarbon oils available from Exxon Chemical Company of Houston, Tex. are preferred. The MAGIESOL solvents have a Kauri butanol value of from about 24 to about 27, an aniline point in the range of from about 75 to about 85° C. and a distillation range of from about 240 to about 280° C. EXXPRINT 283D has a Kauri butanol value of 25, an aniline point of 84° C. and a distillation range of 250 to 268° C.

The amount of solvent charged to the reaction vessel is related to the amount of crosslinked resins in the composition. Typically, the solvent will be charged in an amount that results in a resin composition containing from about 0.7 to about 1.5 parts by weight of solvent per part of resin charged.

Batch reactions, reaction times may range from about 20 or 30 minutes or 1 to about 8 hour or more; more desirably from 20 or 30 minutes to 2 or 3 hours. Since the cross-linking reaction is rapid, a continuous or semi-continuous process may also be used to prepare the shear resistant vehicles. Because the crosslinking reaction is conducted in the presence of an ink solvent, the resulting highly viscous covalently crosslinked product made in the reaction vessel already contains all of the important components of an ink vehicle composition suitable for high speed printing machines, such as lithographic printing presses.

A key feature of the process of the invention is the formation of covalent cross-link bonds in the vehicle composition. In accordance with the invention, polyamine compounds which may be used to induce formation of this bonding may be selected amine formaldehyde reaction products with number average molecular weights from about 100 or 150 to about 4000 or 5000 such as from melamine formaldehyde reaction products, urea formaldehyde reaction products; or polyamine compounds and/or polyamino alcohol compounds with 2 or more amino groups having molecular weights from 50 to about 4000 or 5000 a few which have been found to produce vehicles which exhibit superior solvency properties in lipophilic solvents as compared to high viscosity resins made using conventional non-metal crosslink agents.

In several embodiments, it is desirable that the number average molecular weight of the crosslinkers be below 2000 grams/mole and more desirably below 1000. The preferred crosslink agents are melamine formaldehyde reaction products, urea formaldehyde reaction products, polyalkylene polyamine compounds and/or polyamino alcohols or combinations thereof. The polyamine or polyamino alcohols are desirably predominantly (by weight) comprised of carbon, hydrogen, and nitrogen atoms. They may include oxygen atoms, especially in the alcohols, and other heteroatoms in small percentages.

Desirably, the percentage of atoms other than carbon, hydrogen, and nitrogen are less than 20 wt. % of the crosslinking compounds and more desirably less than 10 or 15 wt. % of the crosslinking compounds. In one embodiment, it is preferred to have polyamines with a predominance numerically of secondary or tertiary amine groups as compared to primary amine groups. In another embodiment, it is preferred that at least 80% of all amino groups are secondary or tertiary amino groups. In one embodiment, it is preferred to that the polyamine compounds used for crosslinking have at least 3 amino groups per molecule. In another embodiment, it is preferred that the polyamine compound used as crosslinking agent have on average at least 4 amino groups per molecule.

The polyamines and polyamino alcohols may be cyclic, aliphatic or aromatic, although aliphatic amines are preferred, with an exception being the melamine formaldehyde crosslinkers which are preferred in several embodiments. In one embodiment, it is desirable that the polyamine crosslinkers have a boiling point at one atmosphere pressure of above 80° C., and in another embodiment the boiling point is above 1001° C.

To form covalent crosslink bonds in the precursor vehicle, the amount of polyamine crosslink agent may range from about 0.5 wt. % to about 15 wt. %, preferably from about 1.0 wt. % to about 5.0 wt. %, and most preferably from about 1.0 wt. % to about 3.5 wt. % when using polyamines or polyamino alcohols that are free of formaldehyde based reaction products and from about 2 to about 6 wt. % when using urea or melamine formaldehyde type of crosslinkers based on the total weight of resin and crosslink agent introduced to the reaction vessel.

The resin, solvent and crosslink agent may be added to the reaction vessel in any order or essentially simultaneously, provided the reaction mass components are maintained under stirred reaction conditions for a period of time at a suitable reaction temperature so that a gelled resin having a desired viscosity is produced. It is preferred, however, to first charge the reaction vessel with the solvent(s), under agitation add the resin(s), heat the solvent(s) and resin(s) to a temperature in the range of from about 120 to about 220° C., preferably from about 150 to about 200° C. The crosslink agent may be added to the reaction vessel all at once or incrementally over time until the target viscosity is obtained.

It is important that the reaction mass containing solvent, resin and crosslink agent be thoroughly mixed while being heated. During the mixing and heating, a crosslink reaction occurs with the resin, providing covalent crosslink bonds in the resulting product. Once the desired viscosity of the shear resistant resin is obtained, the reaction is terminated by cooling the reaction mass to about 100° C. or less. The reaction product containing crosslinked vehicle is then discharged from the reaction vessel by gravity flow or pumping. Because a solvent is used to prepare a shear resistant vehicle, no special equipment is needed to stir the solution during reaction or to pump the solution from the reaction vessel once the reaction is complete.

In general, the crosslinking reaction need not be conducted under an inert gas atmosphere, however, such an inert gas atmosphere may be beneficial for some resins and may aid in controlling excessive color development and for fire suppression. Furthermore, the reaction may be conducted under atmospheric, subatmospheric or superatmospheric pressure conditions. Atmospheric pressure is particularly preferred. Regardless of the pressure in the reaction vessel, it is important that the reactants be maintained at a sufficiently high temperature with intense mixing for a period of time sufficient to achieve the desired level of crosslinking of the components in the reaction product.

Due to the in situ formation of crosslinked vehicle, the product produced by the process of the invention already contains a solvent, preferably a lithographic solvent such as MAGIESOL 47/470, EXXPRINT 283D, linseed oil or soybean oil, typically in an amount ranging from about 10 to about 50 wt. % solvent based on the total weight of the resin/solvent mixture. Accordingly, the viscous reaction product is ready for direct addition to the final ink composition with the other ink components, i.e., pigment, wax compounds and the like.

Further aspects of the invention will now be illustrated by reference to the following non-limiting examples.

Example 1

Vehicle Example A

| Raw Material | % by wt. | Conventional | Important |
|---|---|---|---|
| Alkyd resin | 5 | X | |
| Vegetable oil | 5 | X | |
| Middle boiling ink solvent | 37.7 | X | |
| High boiling ink solvent | 12 | X | |
| | | X | |
| Phenolic resin | 12.4 | X | |
| Rosin ester resin | 16 | X | |
| Hydrocarbon resin | 9.4 | X | |
| Melamine formaldehyde reaction products | 2.5 | | X |
| | | X | |

A Charge alkyd, vegetable oil, middle and high boiling ink solvents
B Under agitation, add rest of resins
C Heat mixture to 360° F. (182° C.)
D Add (melamine formaldehyde reaction products), heat to 380° F. (193° C.) and hold 30 minutes.
E Adjust with middle boiling ink solvent as needed.
(Step D is the innovative step, along with using a higher than conventional temperature to maximize the kinetics of the crosslinking with the melamine-formaldehyde resin)

Vehicle Example B

| Raw Material | Code | % by wt. | Conventional | Important |
|---|---|---|---|---|
| Alkyd resin | | 5 | X | |
| Vegetable oil | | 5 | X | |

-continued

| Raw Material | Code | % by wt. | Conventional | Important |
|---|---|---|---|---|
| middle boiling ink solvent | | 36.9 | X | |
| High boiling ink solvent | | 13 | X | |
| Phenolic resin | | 12.7 | X | |
| Rosin ester resin | | 16.5 | X | |
| Hydrocarbon resin | | 10 | X | |
| Polyamine | | 0.9 | | X |

A Charge alkyd, vegetable oil, middle and high boiling ink solvents
B Under agitation, add rest of resins
C Heat mixture to 340° F. (171° C.)
D Add polyamine, hold 30 minutes.
E Adjust with middle boiling ink solvent as needed.
(Step D is the innovative step, along with using a higher than conventional temperature to maximize the kinetics of the crosslinking with the polyamine/polyamino alcohol.

We tested the materials as vehicles and in ink formulations. Viscosity measurement tests included rotational rheometric measurements of varying shears from 1 sec−1 to 100 sec−1, and oscillatory measurements from 1 hz to 100 hz. Additionally, the inks were printed at a press trial at 1800 ft./minute on a "Harris M2000 Sunday Press" printing press.

The press trial showed the inks made with Vehicle Example A and Vehicle Example B were easier to load into the ink fountains because they exhibited less viscosity (this is a low shear operation), yet resisted viscosity reduction when sheared on the press by exhibiting less "dot gain" than the conventional ink while not losing or detracting from gloss or density. Dot gain refers to the spreading or enlarging of the printed dot which negatively affects printing fidelity and quality.

Flow Viscosities of Inks

| Ink | Viscosity (Pa · s.) @ 5 sec−1 Lower values offers easier processing at low shear | Viscosity (Pa · s.) @ 100 sec−1 Higher values offers less dependence of viscosity to shear rates |
|---|---|---|
| Control Standard A | 511 | 21 |
| Vehicle Example A | 353 | 35 |
| Vehicle Example B | 194 | 28 |

Oscillatory Viscosities of Inks

| Ink | η* (complex viscosity) 0.1 hz/100 hz | G' 40 hz | G" 40 hz | Tan Δ 40 hz |
|---|---|---|---|---|
| Control Std A | 908/48 | 9,000 | 14,800 | 1.64 |
| Vehicle Example A | 368/43 | 7,200 | 13,500 | 1.87 |
| Vehicle Example B | 246/38 | 5,200 | 11,500 | 2.18 |

Print Results

| Ink | Density | Gloss 60°/85° | Dot gain |
| --- | --- | --- | --- |
| Control Std A | 1.33 | 32/49 | 15.5% |
| Vehicle Example A | 1.38 | 34/49 | 13.1% |
| Vehicle Example B | 1.38 | 35/50 | 13.2% |

Control Std. A is a proven, conventional vehicle in current marketplace usage which we used as a standard test vehicle.

The foregoing description of certain embodiments of the present invention has been provided for purposes of illustration only, and it is understood that numerous modifications and alterations may be made without departing from the spirit and scope of the invention as defined in the following claims. The embodiments described herein are the best mode known to applicant for practicing the invention, but it will be understood that other ways of producing high viscosity ink resins according to the claims are encompassed by the invention.

What is claimed is:

1. A process for making a high viscosity gelled ink resin composition which comprises mixing a rosin ester resin with an organic solvent and a crosslinking agent selected from the group consisting of melamine formaldehyde reactions products and urea formaldehyde reaction products to provide a reaction mass and heating the reaction mass under conditions sufficient to produce the gelled ink resin composition which exhibits increased viscosity as compared to the uncrosslinked resin solution and has improved stability against viscosity loss and elasticity degradation from mechanical and thermal stresses imposed during its use in high speed printing machines.

2. The process of claim 1 wherein the reaction is conducted under a nitrogen atmosphere.

3. The process of claim 1 wherein the rosin ester resin has an acid number of no more than about 25, and a solution viscosity in the range of from about Z5.0 to about Z7.0, as measured at 25° C. on one gram of resin dissolved in two grams of alkali refined linseed oil according to the Gardener Holt bubble tube test method.

4. The process of claim 1 wherein the rosin ester resin has an acid number of less than about 25, and a solution viscosity ranging from about Z5.5 to about Z8.0, as measured at 25° C. on one gram of resin dissolved in two grams of alkali refined linseed oil according to the Gardener Holt bubble tube test method.

5. The process of claim 1 wherein the crosslink agent is a melamine formaldehyde reaction product.

6. The process of claim 1 wherein the organic solvent is a high boiling organic solvent having a boiling point in the range of from about 220 to about 310° C.

7. The process of claim 1 wherein the crosslink agent is a urea formaldehyde reaction product.

8. The process of claim 1 wherein the rosin ester resin is selected from the group consisting of gum rosin resins, wood rosin resins, and tall oil rosin resins.

9. The process of claim 1 wherein the organic solvent includes a vegetable oil.

10. The process of claim 1 wherein the level of organic solvent is within the range of 0.7 to 1.5 parts by weight per part by weight of resin.

11. The process of claim 1 wherein the crosslinking agent is mixed into the reaction mass at a level which is within the range of 2 to 6 weight percent, based upon the total weight of resin and crosslinking agent.

12. The process of claim 1 wherein the reaction mass is heated to a temperature which is within the range of 120° C. to 220° C.

13. The process of claim 1 wherein the reaction mass is heated to a temperature which is within the range of 150° C. to 200° C.

* * * * *